(12) United States Patent
Prats Mustarós

(10) Patent No.: US 9,902,468 B2
(45) Date of Patent: Feb. 27, 2018

(54) TENSION LEG PLATFORM STRUCTURE FOR A WIND TURBINE

(71) Applicant: ALSTOM RENEWABLE TECHNOLOGIES, Grenoble (FR)

(72) Inventor: Josep Prats Mustarós, Barcelona (ES)

(73) Assignee: GE Renewable Technologies Wind B.V., Breda (NL)

( * ) Notice: Subject to any disclaimer, the term of this patent is extended or adjusted under 35 U.S.C. 154(b) by 0 days.

(21) Appl. No.: 14/651,647

(22) PCT Filed: Dec. 13, 2013

(86) PCT No.: PCT/EP2013/076467
§ 371 (c)(1),
(2) Date: Jun. 11, 2015

(87) PCT Pub. No.: WO2014/090974
PCT Pub. Date: Jun. 19, 2014

(65) Prior Publication Data
US 2015/0314834 A1 Nov. 5, 2015

Related U.S. Application Data

(60) Provisional application No. 61/764,893, filed on Feb. 14, 2013.

(30) Foreign Application Priority Data

Dec. 14, 2012 (EP) .................................. 12382506

(51) Int. Cl.
B63B 21/50 (2006.01)
E02D 27/10 (2006.01)
(Continued)

(52) U.S. Cl.
CPC ............ *B63B 21/502* (2013.01); *B63B 21/50* (2013.01); *E02D 27/10* (2013.01); *E02D 27/425* (2013.01); *F03D 13/22* (2016.05)

(58) Field of Classification Search
CPC combination set(s) only.
See application file for complete search history.

(56) References Cited

U.S. PATENT DOCUMENTS

| 4,999,959 A | 3/1991 | Virtanen |
| 2004/0105725 A1 | 6/2004 | Leverette et al. |

(Continued)

FOREIGN PATENT DOCUMENTS

| DE | 201 00474 | 5/2001 |
| DE | 201 03421 | 7/2001 |

(Continued)

OTHER PUBLICATIONS

International Search Report and Written Opinion for PCT/EP2013/076467, dated Feb. 11, 2014, 10 pgs.
JP Office Action, dated Oct. 31, 2017.

*Primary Examiner* — Kyle Armstrong
(74) *Attorney, Agent, or Firm* — Dority & Manning, P.A.

(57) ABSTRACT

Tension leg platform structure for wind turbines It comprises a buoyant structure (110), a platform (120) and at least one anchoring tendon (30) for connecting the platform (120) to a seabed (20) comprising at least a hybrid structure with at least one pre-stressed cable (31) and a pre-stressed concrete structure (32) associated therewith. The anchoring tendons (30) may comprise segments of a given length.

17 Claims, 2 Drawing Sheets

(51) Int. Cl.
   *E02D 27/42*    (2006.01)
   *F03D 13/20*    (2016.01)

(56) References Cited

U.S. PATENT DOCUMENTS

| | | | |
|---|---|---|---|
| 2004/0216657 A1* | 11/2004 | Leverette | B63B 39/005 |
| | | | 114/265 |
| 2005/0238439 A1 | 10/2005 | Huang et al. | |
| 2007/0243063 A1* | 10/2007 | Schellstede | F03D 11/045 |
| | | | 416/10 |
| 2008/0014025 A1 | 1/2008 | They | |
| 2011/0037264 A1* | 2/2011 | Roddier | B63B 35/44 |
| | | | 290/44 |
| 2015/0037103 A1* | 2/2015 | Yu | B63B 21/502 |
| | | | 405/223.1 |

FOREIGN PATENT DOCUMENTS

| | | |
|---|---|---|
| DE | 103 00201 | 7/2004 |
| EP | 1174336 | 1/2002 |
| FR | 2 535281 | 5/1984 |
| GB | 2 378 679 | 2/2003 |
| JP | S 63227489 A | 9/1988 |
| JP | 3074144 U1 | 12/2000 |
| JP | 2010-234965 A | 10/2010 |
| WO | WO 2009/131826 | 10/2009 |
| WO | WO 2010/082153 | 7/2010 |

\* cited by examiner

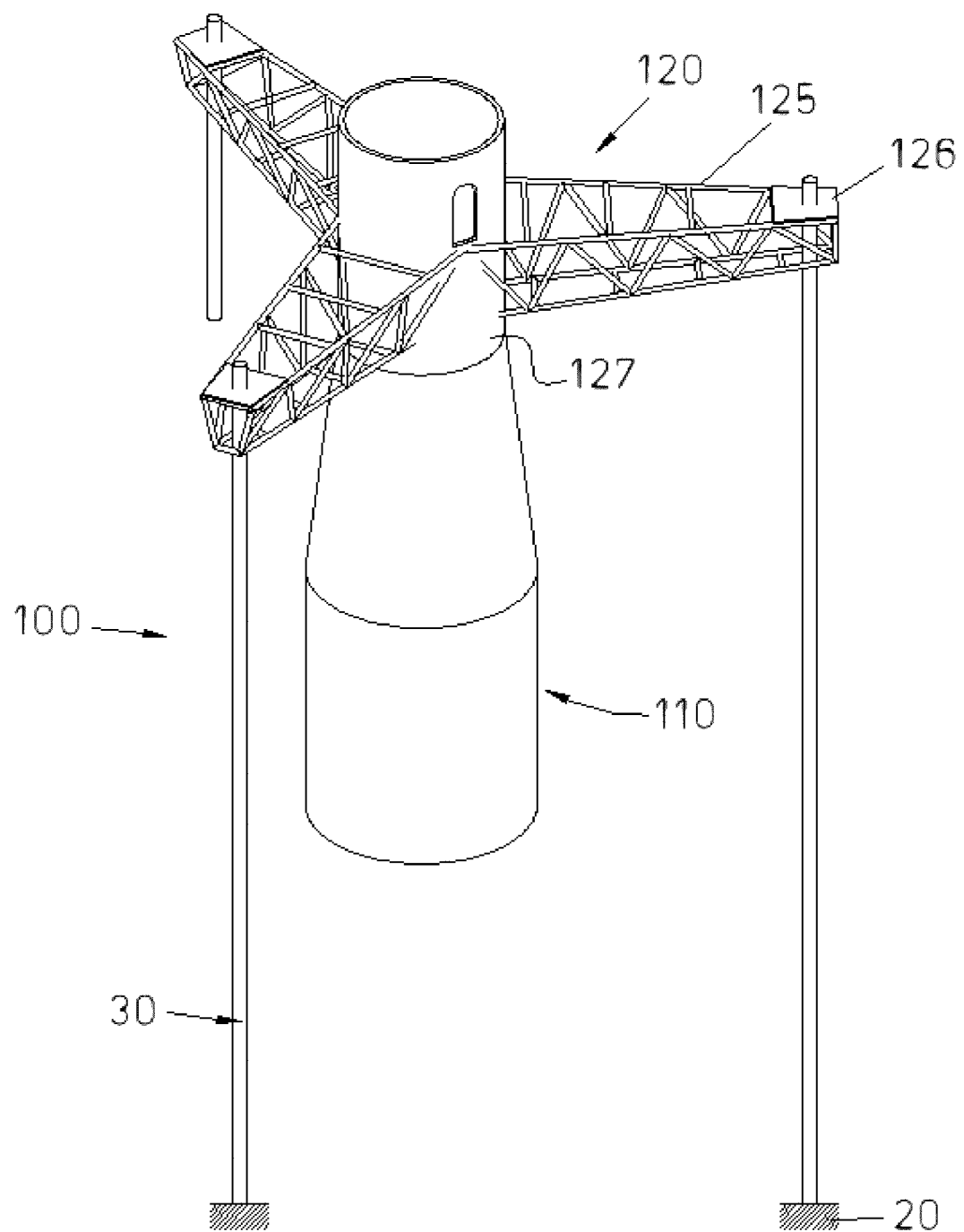

TENSION LEG PLATFORM STRUCTURE FOR A WIND TURBINE

This application claims the benefit of European Patent Application EP12382506.9 filed Dec. 14, 2012, and U.S. Provisional Patent Application Ser. No. US 61/764,893 filed Feb. 14, 2013.

Tension leg platform (TLP) structures for offshore wind turbines are disclosed.

BACKGROUND

TLP structures were originally developed for the offshore oil or gas industry. Examples thereof are described in the international patent application WO2010082153 and U.S. Pat. No. 6,910,438.

TLP structures are now currently being considered also in wind turbine applications, particularly in offshore wind turbine applications.

In general, TLP structures for offshore wind turbines comprise a platform and a buoyant or floating structure designed to be placed on the sea. In cases where the platform is a closed structure to be placed under the sea level, the platform itself may act as a buoyant structure. A TLP structure may further comprise a transition piece that joins the wind turbine tower and the platform together.

The buoyant structure and the platform are held in place by means of anchoring legs or tendons acting as mooring lines that are fastened to the seabed. The buoyant structure and the platform are designed to be stable enough to support the tower and the nacelle assembly of the wind turbine in varying weather conditions.

Document WO2009131826 discloses, for example, an offshore wind turbine platform to be anchored to the seabed through mooring lines. An asymmetric mooring system connects the seabed to the column that carries the wind turbine.

In offshore wind turbine applications, the tendons in the TLP structures are formed of high strength tubular members such as cables. The tendons are provided with articulated connections to fix their ends to the corners of the platform and to the seabed. The tendons may also be made of steel concrete as shown in document US2008014025.

The high axial stiffness of the tendons allows the horizontal movement of the platform (surge and sway motion), and at the same time it does not allow the vertical movement (heave motion) and the rotational movement (pitch and roll motions) of the platform caused by the wind turbine operation, the wind and the waves.

Wind turbines are currently producing increasingly more power and consequently they are requiring increasingly larger sizes. In addition, both the tension leg platforms and the offshore wind turbines must be manufactured taking into consideration the elastic behaviour of the Eigen frequencies of the pitch and roll movement in the wind turbine and the platform structure caused by the wind turbine operation, the wind and the waves. In addition, the frequencies of heave movement must be also kept below given values.

The goal is therefore preventing the frequency of the assembly from being the same as that of the waves. The frequencies of heave, surge and sway modes are very low due to low modal associated stiffness and high modal inertia that causes the assembly to act as a rigid structure. The fact that these frequencies are lower than those of the waves results in that the structure dynamics is not excited by the waves.

By contrast, the frequencies of pitch, roll and yaw movements are higher but sometimes they may decrease to become close to those of the waves. Therefore, it is desired that the frequencies of pitch, roll and yaw movements are higher. This is typically achieved by oversizing the tendons, for example, increasing their wall thickness or increasing the number of cables per tendon, for an increased structural strength and stiffness in order to withstand the involved forces. This however undesirably results in increased costs.

A TLP structure is proposed herein intended to provide enhanced mechanical properties in terms of strength and stiffness while reducing costs.

SUMMARY

The present tension leg platform (TLP) structure for wind turbines, preferably of the offshore type, includes a buoyant structure, a platform, and at least one anchoring tendon for connecting the platform to a seabed, wherein the anchoring tendon comprises at least a hybrid structure formed of at least a first pre-stressed structure and a second, different pre-stressed structure associated therewith.

The present TLP structure for wind turbines comprises a buoyant structure and a platform. The platform of the present TLP structure may be formed of a number of arms, for example three. The platform or the arms forming the platform of the TLP structure can be adapted to be positioned either at least above the sea level or at least below the sea level in operation. In the latter case, the arms act themselves as a buoyant structure.

The platform or the arms forming the platform of the present TLP structure may preferably be a lattice structure and it may be provided with a buoyant structure to be placed at least partially under the sea level for providing the required buoyancy to the assembly.

The present TLP structure further comprises at least one anchoring tendon that is suitable for connecting the platform to a seabed surface.

According to one important feature of the present TLP structure, the anchoring tendon comprises at least a hybrid structure that is formed of at least a first pre-stressed structure and a second, different pre-stressed structure associated therewith.

The fact that the pre-stressed structures forming the hybrid structure are different to each other means that at least they have different mechanical properties to each other. In addition, the term hybrid structure as used herein stands for a structure formed of at least two different materials of entirely different origin, kind or nature having different properties. For example, the first pre-stressed structure may comprise at least one pre-stressed cable forming a core of the anchoring tendon and the second pre-stressed structure may comprise at least one pre-stressed concrete structure surrounding the first pre-stressed structure.

In some examples, the cable is pre-stressed in tension and the concrete structure is pre-stressed in compression.

The pre-stressed cable or cables may be made of a high stiffness pre-stressed metal. In some examples, the cable may be made of steel and/or polyester. At least one of the cables may be formed of a number of wires.

Therefore, hybrid anchoring tendons are provided made of at least two different materials. By making the anchoring tendons of two different materials having different mechanical properties, specifically one low cost material with high compressive strength and a material with high tensile strength, a resulting low cost stiff anchoring tendon structure is obtained.

The first pre-stressed structure is designed to withstand the working loads and to pre-stress the second pre-stressed structure in operation with said second pre-stressed structure having higher stiffness than the first pre-stressed structure. In other words, the first pre-stressed structure is designed to directly of indirectly compress the concrete structure for providing stiffness.

In preferred examples, the cable or cables of the anchoring tendons may form a core in the respective anchoring tendon with the concrete structure surrounding the at least one cable. Therefore, the cross section of the compressed concrete structure will in this case be greater than said at least one pre-stressed cable.

The anchoring tendon comprises at least one anchoring end. The anchoring end of the tendon is suitable for a hinged attachment to the platform and/or to the buoyant structure and/or to the seabed. In preferred examples, one anchoring end of one tendon is attached to one free end of the arms of the platform while the other, opposite anchoring end of said tendon is attached to the seabed.

In one example, the anchoring tendon may comprise a number of segments of a given length. Said tendon segments may be of different structural and/or mechanical characteristics depending of the sea depth. The tendon segments could be installed tensioned in site or they may be already pre-stressed during its manufacturing. Each of the tendon segments may comprise at least one pre-stressed cable and a pre-stressed concrete structure associated therewith. In turn, and as stated above, one or more of the cables may be formed of a number of wires. Each tendon segment may be also provided with a suitable mechanism for connecting the tendon segments to each other. In one preferred example, such mechanism for connecting the tendon segments to each other comprise hinge elements, such as a chain, allowing the segments to be rotated to each other, for example approximately at least up to 180°. This allows the structure to be folded for facilitating transportation.

With the above structure, most of the stiffness is provided by the pre-stressed concrete structure. The concrete structure of the tendons of the present TLP structure is a highly pre-stressed structure resulting in a very rigid structure due to the high stiffness of the concrete under compression. The concrete structure of the tendons of the present TLP structure is compressed to the extent that even when the tendons are subjected to tension due to the buoyant force on the buoyant structure, the concrete structure is still compressed. This results in that the concrete provides stiffness such that the cables of the tendons of the present TLP structure could even be sized only taking forces into consideration, without considering the influence of cable stiffness on resonance frequencies.

With the present TLP structure, the amount of material (e.g. steel) required for the manufacture of the anchoring tendons is significantly reduced while the stiffness is advantageously increased with a resulting reduction in costs. With the present TLP structure, pitch and roll Eigen frequencies are well controlled. The hybrid anchoring tendon structure allows loads to be mitigated through an advantageous dynamic tuning. Torque and thrust can be also controlled for damping oscillations in pitch and roll movements. In addition, the proposed TLP structure can be standardised easily.

Additional objects, advantages and features of examples of the present tension leg platform structure will become apparent to those skilled in the art upon examination of the description, or it may be learned by practice thereof.

BRIEF DESCRIPTION OF THE DRAWINGS

Particular examples of the present tension leg platform structure will be described in the following by way of non-limiting examples, with reference to the appended drawings.

In said drawings:

FIG. 5 is a full detailed perspective view of the present tension leg platform structure.

DETAILED DESCRIPTION OF EXAMPLES

Figure 1:
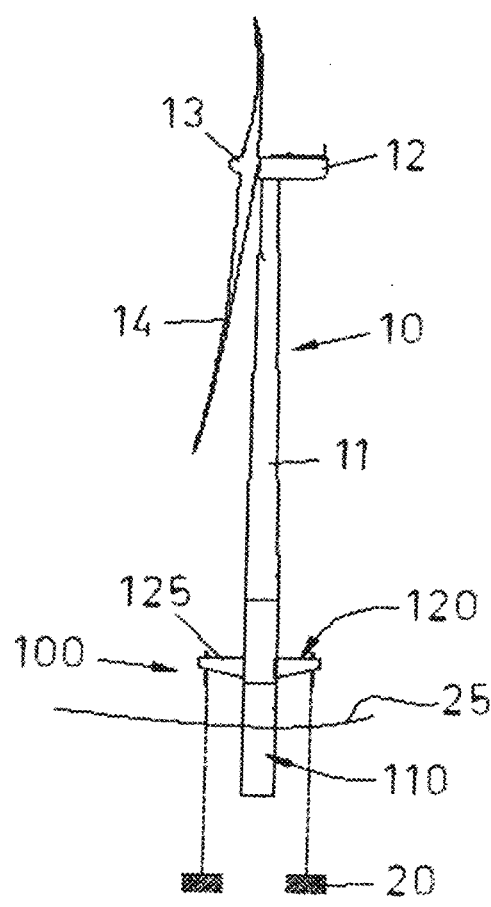
FIG. 1 is an elevational view diagrammatically showing one particular example of the present tension leg platform structure where the platform is positioned above the sea level.

The drawings show several views of several examples of the present tension leg platform (TLP) structure, where like reference numerals refer to like parts throughout the description.

An offshore wind turbine 10 is shown in FIGS. 1 including a tower 11, a nacelle 12 disposed at the top of the tower 11, and a rotor 13 operatively coupled to a generator (not shown) fitted inside the nacelle 12. The nacelle 12 of the wind turbine 10 also houses other components therein for converting wind energy into electrical energy. The rotor 13 of the wind turbine 10 includes a number of blades 14 that are configured to receive the air that causes them to spin about a longitudinal axis.

The tower 11 is fixed to the seabed 20 by means of the present TLP structure, which has been indicated as a whole at 100 in the drawings. The TLP structure 100 comprises a buoyant structure 110 that provides the required buoyancy to the wind turbine 10. The TLP structure 100 further comprises a platform 120. The platform 120 is formed of three arms 125 having respective free ends 126.

Figure 4:
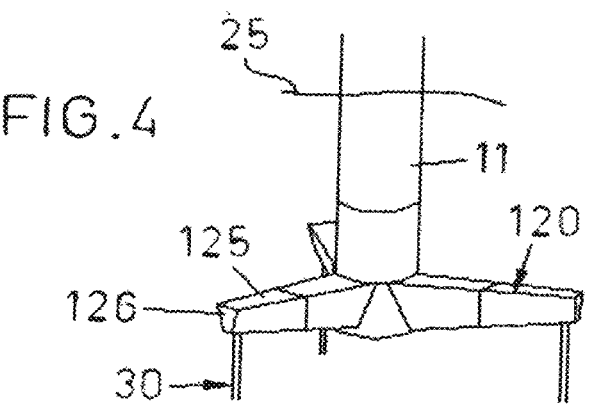
FIG. 4 is an elevational view diagrammatically showing a further example of the present tension leg platform structure where the platform is positioned under the sea level.

In the example shown in FIG. 1, the platform 120 with the arms 125 is positioned above the sea level 25. However, the present TLP structure 100 is also applicable in examples where the platform 120 with the arms 125 is positioned under the sea level 25, as shown in FIG. 4. In this case, the arms 125 act as the buoyant structure 110.

As shown in FIG. 5, the arms 125 of the platform 120 are formed of a lattice structure defined by a number of bars connected through a number of cross braces. The particular example shown in FIG. 5 corresponds to that shown in FIG. 1 where the arms 125 are intended to be positioned above the sea level 25. The arms 125 are part of and act as the platform 120 and define a central portion 127 that is attached to the buoyant structure 110 as shown in FIG. 5. The arms 125 thus project outwards radially from the buoyant structure 110 with the buoyant structure 110 extending upwards and especially downwards the platform 120.

The TLP structure 100 shown in the figures further comprises three anchoring tendons 30, one for each arm 125 of the platform 120. One example of an anchoring tendon 30 is shown in detail in FIG. 2 and particularly one segment thereof as explained below.

The purpose of the anchoring tendons 30 is to connect the platform 120 to the seabed 20 and hold the wind turbine 10 in place.

Figure 2:
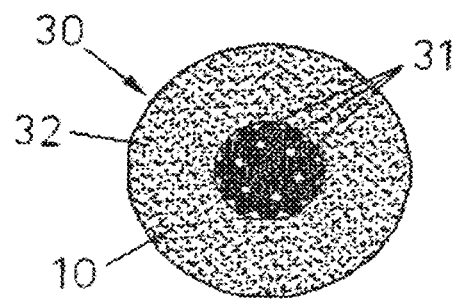
FIG. 2 is an enlarged cross sectional view of one specific example of one anchoring tendon of the present tension leg platform structure.
Figure 3:
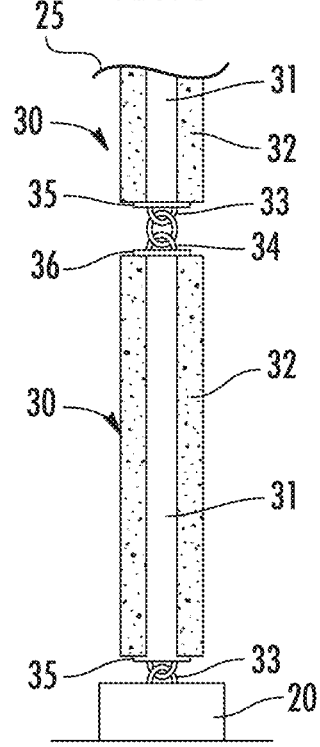
FIG. 3 is a sectional view showing of one length of the anchoring tendon shown in FIG. 2 where a further anchoring tendon connected thereto is partially shown.

As shown in FIGS. 2 and 3, the anchoring tendon 30 is a hybrid structure, that is, a structure made of at least two different materials of different nature having different properties. Specifically, the anchoring tendons 30 of the TLP structure 100 each comprises one or more tension pre-stressed cables 31 made of a high stiffness pre-stressed metal. At least one of the pre-stressed cables 31 may be in turn formed of a number of wires.

The hybrid anchoring tendons 30 further comprises a compression pre-stressed concrete structure 32 surrounding the cable or cables 31 as shown in FIG. 2.

In addition, the anchoring tendons 30 are each provided with respective anchoring ends. The anchoring ends are attached to or are part of the pre-stressed cable or cables 31. The anchoring ends of the tendons 30 allows a hinged attachment of the tendons 30 both to the seabed 20 and to the free ends 126 of the arms 125 of the platform 120.

The anchoring tendons 30 may be continuous as shown in the example of FIG. 5.

However, alternatively or additionally, the anchoring tendons 30 may be formed of segments of a given length, such as 30 m, as shown in FIG. 3. One example of a tendon segment is shown in said FIG. 3, comprising the inner high stiffness pre-stressed cable 31 surrounded by the compression pre-stressed concrete structure 32 as shown in FIG. 2.

The tendon segments are also provided with respective anchoring ends 33, 34 to interconnect to other tendon segments to form an anchoring tendon. In the particular example shown in FIG. 3, the anchoring ends 33, 34 comprise respective connecting chains that connect the hybrid tendon segments to each other acting as a hinge element.

Each hybrid tendon segment includes opposite fastening plates 35, 36 fitted at the ends thereof. The fastening plates 35, 36 of the tendon segments serve the purpose of keeping the concrete structure 32 in the compressed condition.

The fastening plates 35, 36 carry the connecting chains 33, 34 for connecting the hybrid tendon segments to each other. However, the fastening plates 35, 36 could also serve the purpose of connecting the tendon segments to each other directly, that is, without using the connecting chains 33, 34. In this case, the cables 31 should be attached to the fastening plates 35, 36. The tendon segments could be alternatively connected to each other directly through the cables 31 with the cables 31 passing through the fastening plates 35, 36.

With the above solution, a single anchoring tendon 30 could have tendon segments made of different structural and/or mechanical characteristics. Said mechanical characteristics may vary depending e.g. of the sea depth. For example, the outer diameter of the concrete structure 32 may be adapted to sea depth. In some cases, anchoring tendons 30 may be provided with a concrete structure 32 of varying outer diameter under swell zones while leaving the cables 31 in the same anchoring tendon 30 exposed above said swell zones.

Although only a number of particular examples and examples of the present TLP structure have been disclosed herein, it will be understood by those skilled in the art that other alternative examples and/or uses and obvious modifications and equivalents thereof are also possible.

The present disclosure covers all possible combinations of the particular examples described herein.

Reference signs related to drawings and placed in parentheses in a claim are solely for attempting to increase the intelligibility of the claim, and shall not be construed as limiting the scope of the claim. Thus, the scope of the present disclosure should not be limited by particular examples, but should be determined only by a fair reading of the claims that follow.

The invention claimed is:

1. A tension leg platform structure for wind turbines, the tension leg platform structure comprising:
   a buoyant structure;
   a wind turbine platform; and
   at least one anchoring tendon for connecting the platform to a seabed,
   wherein the anchoring tendon comprises a plurality of tendon segments made of different structural and/or mechanical characteristics that vary depending on the sea depth, each of the tendon segments comprising an overall length defined by a first end and a second end, each of the tendon segments comprising opposing fastening plates fitted at each of the first and second ends, each of the tendon segments comprising a hybrid structure formed of a first pre-stressed structure forming a single core of the tendon segment, and a second, different pre-stressed structure surrounding the first pre-stressed structure, the first pre-stressed structure comprising at least one pre-stressed cable that extends from the first end to the second end and terminates before the opposing fastening plates, and
   wherein the tendon segments comprise a uniform diameter along an entire length thereof.

2. The tension leg platform structure of claim 1, wherein the second pre-stressed structure comprises at least one pre-stressed concrete structure.

3. The tension leg platform structure of claim 1, wherein a cross section of the second pre-stressed structure is greater than a cross-section of the first pre-stressed structure.

4. The tension leg platform structure of claim 1, wherein the first pre-stressed structure is designed to pre-stress the second pre-stressed structure in operation.

5. The tension leg platform structure of claim 1, wherein the anchoring tendon comprises at least one anchoring end for a hinged attachment to the seabed and/or the platform.

6. The tension leg platform structure of claim 1, further comprising a mechanism for connecting the tendon segments to each other.

7. The tension leg platform structure of claim 6, wherein at least two of the tendon segments have different pre-stress values of the first and second structures depending on the sea depth.

8. The tension leg platform structure of claim 6, wherein the mechanism for connecting the tendon segments to each other comprises hinge elements allowing the tendon segments to rotate relative to each other.

9. The tension leg platform structure of claim 6, wherein the mechanism for connecting the tendon segments to each other comprises hinge elements allowing the tendon segments to rotate relative to each other up to at least 180°.

10. The tension leg platform structure of claim 1, wherein the cable is pre-stressed in tension.

11. The tension leg platform structure of claim 1, wherein the second pre-stressed structure is a concrete structure and the concrete structure is pre-stressed in compression.

12. The tension leg platform structure of claim 1, wherein the pre-stressed cable is made of steel and/or polyester.

13. The tension leg platform structure of claim 1, wherein the platform comprises a number of arms.

14. The tension leg platform structure of claim 13, wherein the platform comprises three arms.

15. The tension leg platform structure of claim 1, wherein the platform is a lattice structure.

16. The tension leg platform structure of claim 1, wherein the platform is adapted to be positioned either above or below sea level in operation.

17. The tension leg platform structure of claim 1, wherein the outer diameter of the second pre-stressed structure varies according to the sea depth.

\* \* \* \* \*